United States Patent [19]

Cazalis et al.

[11] Patent Number: 4,949,863
[45] Date of Patent: Aug. 21, 1990

[54] ISOLATOR FOR WORK IN AN ASEPTIC ENVIRONMENT

[75] Inventors: Jean-Pierre Cazalis, Sigoules; Bernard S. Martin, Montrouge, both of France

[73] Assignee: ISO Concept, Boulogne, France

[21] Appl. No.: 191,174

[22] Filed: May 6, 1988

[51] Int. Cl.⁵ .............................................. B25J 21/00
[52] U.S. Cl. ................................... 220/9.1; 220/232; 312/1; 383/121.1
[58] Field of Search ................... 220/9.1, 232, 306; 312/1; 383/121.1

[56] References Cited

U.S. PATENT DOCUMENTS

| 773,500 | 10/1904 | Hizer | 383/121.1 X |
|---|---|---|---|
| 2,377,311 | 6/1945 | Campbell | 383/121.1 |
| 2,785,824 | 3/1957 | Reeves | 220/232 |
| 2,786,740 | 3/1957 | Taylor et al. | 312/1 |
| 3,006,396 | 10/1961 | Cushman | 220/232 X |
| 3,084,684 | 4/1963 | Saunders | 312/1 |
| 3,627,170 | 12/1971 | Pulliam | 220/306 |
| 4,471,880 | 9/1984 | Taylor | 220/306 |

FOREIGN PATENT DOCUMENTS

| 2510458 | 2/1983 | France . |
|---|---|---|
| 935195 | 8/1963 | United Kingdom . |
| 2048822 | 12/1980 | United Kingdom . |

Primary Examiner—Robert G. Nilson
Attorney, Agent, or Firm—Kerkam, Stowell, Kondracki & Clarke

[57] ABSTRACT

An isolator (10) formed to facilitate the entry and exit of products into and out of the isolator, the wall (12) of which includes an upper part (16) and a lower part (18) capable of being disconnected completely along one section of the isolator. The upper part (16) includes a flexible wall (24) forming a skirt, the lower edge of which emcompasses the upper edge of the lower part (18). A sealed connection of the two parts is obtained by inflating an inflatable seal (36) mounted in a recess (34) formed in a rigid portion of the lower part (18). The seal (36) then comes into sealing contact with an unstretchable belt (26) affixed to the lower end of the flexible wall (24).

7 Claims, 1 Drawing Sheet

ISOLATOR FOR WORK IN AN ASEPTIC ENVIRONMENT

FIELD OF THE INVENTION

The invention relates to an isolator intended for performing various work in an aseptic environment; such an isolator is usable in particular in the medical and pharmaceutical industries.

BACKGROUND OF THE INVENTION

The manufacture and packaging of products such as medicines or substances intended for instance for feeding a patient parenterally are generally performed in an aseptic environment. To do so, a work insolator defining a closed and sealed volume to which access is gained via an opening that is normally closed with a port in a sealed manner is typically used. Products are introduced to the inside of this work isolator by means of a shuttle isolator of relatively small size, designed so that in a sealed manner, the shuttle isolator can come alongside the opening, made for this purpose, in the work isolator. This shuttle isolator is in turn supplied from an intermediate storage isolator in which the products are sterilized.

In the current configuration, the products and materials coming from the outside are introduced via a closable opening of limited size into an isolator that is generally specialized for sterilization. After the isolator and its contents have been sterilized, the contents are transferred into a work isolator kept in a continuously aseptic state. This transfer is done either directly or by means of a shuttle isolator, but always through closable openings of limited size. Once their use is finished, the products and materials are evacuated to outside the work isolator either by the reverse process, or by other means suitable for maintaining the aseptic condition of the work isolator.

In this design, the order in which the operations inside the work isolator are performed is limited by the possibility of introducing products provided by the sterilization isolator and/or the shuttle isolator. Regardless of the number of isolators used, all the transfers are performed via closable openings, most frequently circular in shape, which open to the outside or communicate with one another; these openings are limited in size, being on the order of 500 mm in diameter, for example. These dimensional constraints impose a highly disadvantageous loading and unloading time of the isolator or isolators and require the permanent presence of two operators.

In the frequent case where the equipment includes at least one sterilization isolator and one work isolator, it is necessary under the same conditions to transfer the products from one isolator to the other, which doubles or triples the number of manipulations involved.

Equipment of this kind also has the disadvantage of being relatively complex and delicate to use, since the sterilization isolator must be continuallly re-sterilized.

In British Pat. No. 935,195, an apparatus has been proposed including a fixture connected to a rigid base, and a certain number of panels that can be deployed over the fixture, in the manner of a tent awning. The lower ends of each panel are fixed on the rectangular contour of the base by button-and-buttonhole-like fasteners. Although this structure assures easier access to the closed volume, it does so to the detriment of tightness. In particular, satisfactory tightness is unattainable even if the apparatus is provided with sealing rings between the adjacent panels and between the end of each panel and the base.

SUMMARY OF THE INVENTION

It is an object of the invention to provide a perfectly sealed isolator making it possible, in particular, to perform work in an aseptic environment, and having a design which makes it possible to introduce a major volume of products into the isolator, in a single operation, without requiring any external isolator.

To this end, in accordance with the invention, a sealed isolator is provided including a wall including a lower rigid part, an upper edge of which is defined by a rigid belt, and an upper part including a flexible side wall, a lower edge of which is capable of being connected in a disconnectable manner to the rigid belt, characterized in that the rigid belt has a convex shape, the flexible side wall being embodied as a single piece and defined on its lower edge by a deformable belt capable of encircling said rigid belt in a sealed manner.

With an isolator of this kind, it becomes possible to introduce a large quantity of products in a single operation, by folding over the flexible portion of the upper part to the wall after having disconnected the lower part. It should be noted that this operation can be performed regardless of the packaging of the products. Next, the two parts of the isolator are re-connected in a sealed manner, and the atmosphere contained in the closed volume is sterilized before the work to be done is undertaken.

In a first embodiment of the invention, the deformable belt is unstretchable; the rigid belt has at least one inflatable seal capable of coming into sealed contact with the deformable belt over the entire periphery of this deformable belt.

In a second embodiment of the invention, the deformable belt is elastic, in such a way as to be capable of encircling the rigid belt in a sealed manner, by stretching.

Preferably, the elastic belt then has regularly distributed eyelets capable of being fitted over the heads of rivets that are integral with the rigid belt. A satisfactory positioning of the elastic belt on the rigid belt is thus assured.

In each of these two embodiments, the lower part of the wall is preferably rigid.

A preferred embodiment of the invention and a variant of this embodiment will now be described, by way of examples that are in no way limiting, with reference to the accompanying drawings.

DESCRIPTION OF THE PREFERRED EMBODIMENTS

Figure 1:
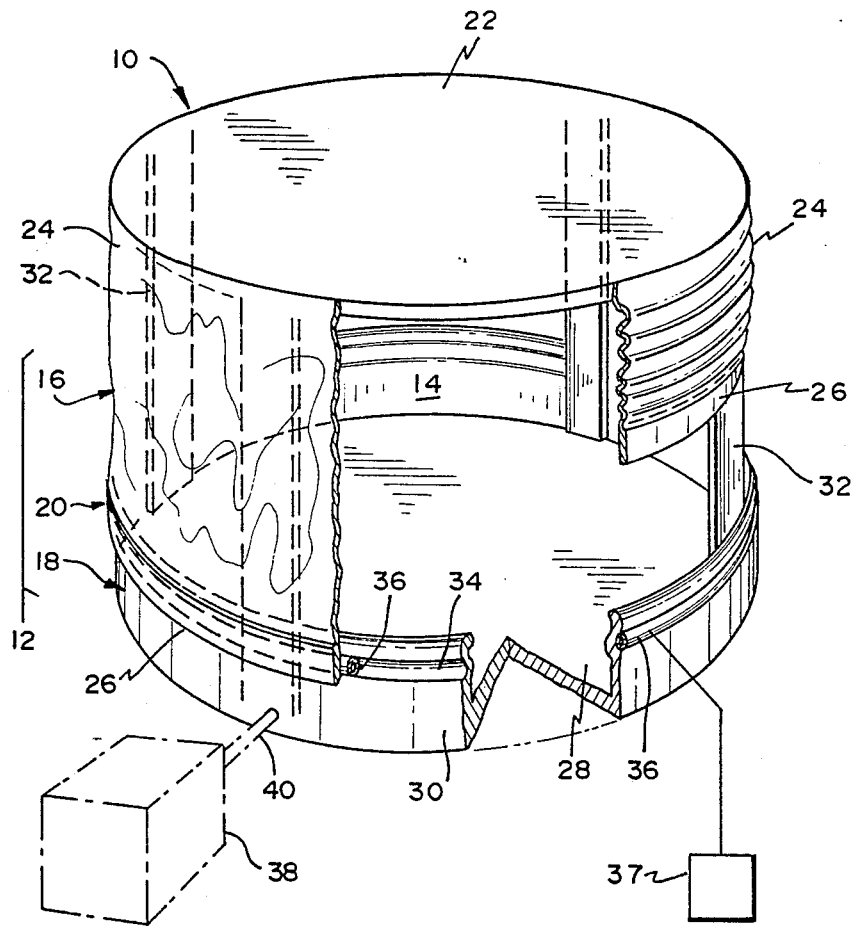
FIG. 1 is a partially cut-away perspective view, schematically showing a preferred embodiment of an isolator according to the invention.

The isolator according to the invention and shown in FIG. 1 is generally designated by reference numeral 10. In the exemplary embodiment shown, this isolator has the shape of a cylinder having a vertical axis. Nevertheless, this shape or form is in no way limiting, and other shapes may be used provided that the side wall has a convex shape in horizontal section.

Typically, the isolator 10 may include a wall 12 defining a closed volume 14, which is sealed with respect to the outside. According to the invention, the wall 12 is not made in a single piece. Instead, it includes an upper part 16 and a lower part 18 designed such that the parts are capable of being completely disconnected with one another. To this end, sealing and disconnectable connection means 20 are provided between the two parts 16 and 18.

In the exemplary embodiment shown in FIG. 1, which relates to a cylindrical isolator, the upper part 16 of the wall 12 includes a rigid horizontal top 22 approximately in the shape of a disk. The upper edge of a flexible side wall 24, which is preferably transparent, is fixed in a sealed manner to the peripheral edge of the top 22. In the example shown, this flexible wall 24 is approximately in the shape of a cylinder generated by rotation about a vertical axis.

A deformable belt 26 which is unstretchable and forms a portion of the connection means 20 is fixed in a sealed manner to the lower end of the flexible wall 24. The lower part 18 of the wall 12 of the isolator, in turn, includes a rigid horizontal base 28, on which the isolator rests. This base 28, generally in the shape of a disk, may be extended at its periphery by a cylindrical wall 30 that is curved upward and is likewise rigid. This cylindrical wall 30 rises up to a level slightly above the level of the belt 26 that is fixed to the lower end of the flexible wall 24. Moreover, the outside diameter of this rigid cylindrical wall 30 is very slightly less than the inside diameter of the flexible, unstretchable belt 26, such that this belt can wrap itself about the upper part of the cylindrical wall 30, as shown on the left-hand side of FIG. 1.

The support of the rigid top 22 can be assured either in a manner totally independent of the base or by means of a rigid fitting, embodied for example by vertical members 32 distributed at regular intervals about the vertical axis of the isolator and connecting the top 22 to the lower part 18 of the wall 12.

To complete the sealed and disconnectable connection means 20, the upper part of the cylindrical wall 30 may have an annular recess 34 on its outside peripheral face. This recess 34 is positioned at the level of the belt 26 and serves to accommodate an inflatable seal 36, as best shown on the right-hand side of FIG. 1. The dimensions of the seal 36 are such that its inflation has the effect of putting it into sealed contact with the inside surface of the belt 26, when the belt is positioned about the upper part of the cylindrical wall 30. At 37, the device with which the seal 36 can be inflated and deflated at will has been shown schematically.

The isolator schematically shown in FIG. 1 is also equipped with a sterilizer 38 of a known type which communicates with the closed column 14 defined by the wall 12 through a tubing system 40.

If it is desired to use the isolator 10 of FIG. 1 to make or package a product in an aseptic environment, the seal 36 is deflated in order to disconnect the belt 26 from the cylindrical wall 30. The belt 26 and the flexible wall 24 forming a skirt can now be raised upward, as shown on the right-hand part of FIG. 1, which opens up very large access to the interior of the volume 14. A very large quantity of different products and materials can thus be introduced in a short time, and in any kind of packaging, to the inside of the volume 14.

Once these preliminary operations have been completed, the flexible wall 24 is again strained in such a way as to place the belt 26 about the upper part of the cylindrical wall 30, as the left-hand part of FIG. 1 shows. The seal 36 is then inflated in order to insure, simultaneously, both the connection of the two parts 16 and 18 of the wall of the isolator and the tightness of the closed volume 14. Prior to performing the various tasks for which the isolator 10 is intended, the closed volume 14 defined by the wall 12 is sterilized with the aid of the sterilizer 38.

For simplification, only those parts of the isolator that relate to the invention have been shown in FIG. 1. In practice, this isolator may also be equipped in a known manner with a circuit for ventilation and filtration of the closed volume 14 and with means with which all the manipulations necessary inside this volume can be performed from a distance, once the connection means 20 have been connected. These manipulation means include, for example, gloves turned inside out and positioned into the flexible wall 24, one or more remote handling devices, and/or one-half of a pressure suit affixed to the base 28 of the isolator.

In the variant embodiment of FIG. 2, the isolator 110 is substantially similarly to that of FIG. 1, with the exception of the sealing and disconnectable connection means 120, which will now be described.

Figure 2:
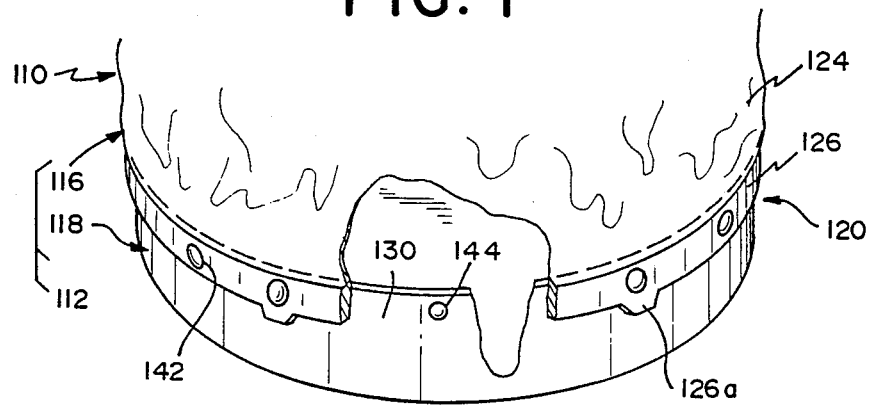
FIG. 2 is a partially cut-away perspective view, illustrating an alternative embodiment of sealed and disconnectable connection means connecting the upper and lower parts of the isolator.

In FIG. 2, the connection means 120 may include a deformable sealed and elastic belt 126, affixed in a sealed manner to the lower edge of the flexible wall 124 of the upper part 116 of the isolator. This elastic belt 126 can be stretched in order to be placed over the upper part of the rigid cylindrical wall 130 of the lower part 118 of the wall. Because of this kind of configuration, the joining of the upper and lower parts 116 and 118, respectively, of the all 112 of the isolator, as well as the tightness of the connection, are obtained in a single operation.

Preferably, in order for the stretching of the elastic belt 126 to be distributed in as uniform a manner as possible over the entire periphery of the isolator, and to avoid a possible accidental disconnection of the two parts 116 and 118, eyelets 142 are distributed regularly over the entire length of the belt 126. As FIG. 2 clearly shows, these eyelets 142 are provided so as to be fitted over the heads of rivets 144 fixed at the same intervals on the upper part of the rigid cylindrical wall 130. Tabs 126a can then be provided on the belt 126 to facilitate its removal.

It will be understood that the invention is not limited to the embodiments that have just been described by way of example but instead also encompasses any variants thereof.

Hence in the two embodiments described, the lower parts 18 and 118 of the wall can be made slightly differently.

The lower part of the isolator has been described as being rigid, in a single piece, and including an edge that is curved upward. In a variant, this edge may also be curved downward. Also, when the isolator has large dimensions, this lower part can be made in several rigid parts. Tightness is then preserved by sheathing the entire lower part with a flexible base made in a single piece, to which the upper part of the wall is connected in a sealed manner.

Finally, the isolator according to the invention can also be used to handle toxic or dangerous products. The atmosphere inside the isolator is then kept at negative pressure, to protect persons located outside it.

What is claimed is:

1. A sealed isolator for handling aseptic process and/or toxic or dangerous products comprising a wall (12) having a rigid lower part (18), an upper edge of which lower part is defined by a rigid belt (30), an upper part (16) including a top and a flexible side wall (24), fixed in a sealed manner to a peripheral edge of the top, a lower edge of which upper part is formed to be connected in a disconnectable manner over the rigid belt (30), wherein the rigid belt (30) has a convex shape, and the flexible side wall (24) comprises a single piece which is defined on its lower edge by a deformable belt (26) capable of encircling the rigid belt (30) and sealing the parts, and wherein the deformable belt (26) is unstretchable, and the rigid belt (30) has an inflatable seal (36) formed to sealingly contact the deformable belt (26) over an entire periphery of the deformable belt, and wherein the inflatable seal is positioned in a recess in the rigid belt.

2. An isolator as defined by claim 1, wherein the lower part (18, 118) of the wall is completely rigid.

3. An isolator as defined in claim 1 wherein the rigid belt is an upwardly projecting portion at a periphery of the lower part.

4. An isolator as defined in claim 1 further comprising a sterilizer connected by a tube to a volume inside of the wall for sterilizing said volume.

5. A sealed isolator for handling aseptic processes and/or toxic or dangerous materials comprising an upper part having a flexible side wall, a lower part having a rigid side wall, a deformable belt disposed on a portion of the flexible side wall which is adapted to be positioned over the rigid side wall, and means disposed in the rigid side wall and cooperable with the deformable belt for sealing and disconnectably connecting the flexible and rigid side walls together, and wherein the sealing and connecting means comprises an inflatable seal member disposed in a peripheral recess of the rigid side wall.

6. The isolator as defined in claim 5 wherein the rigid side wall projects up from a floor surface of the lower part.

7. An isolator as defined in claim 5 further comprising a sterilizer connected by a tube to a volume inside of the wall for sterilizing said volume.

* * * * *